United States Patent Office 3,644,528
Patented Feb. 22, 1972

3,644,528
CALCIUM OR MAGNESIUM-KETONE REACTION PRODUCTS AS POLYMERIZATION INITIATORS
James D. Brown and Carl A. Uraneck, Bartlesville, Okla., assignors to Phillips Petroleum Company
No Drawing. Filed Jan. 23, 1969, Ser. No. 793,549
Int. Cl. C07c 49/76
U.S. Cl. 260—591    10 Claims

ABSTRACT OF THE DISCLOSURE

Polymerization initiators are produced from contacting substantially pure calcium or magnesium metal with diaryl ketones, aryl-substituted cyclopentadienones, or ketones in which the carbonyl group is present in a five-membered carbocyclic ring to which is attached at least two fused aromatic rings.

---

This invention relates to a process for manufacturing polymerization initiator products and to the composition of matter thereby produced. In another embodiment this invention relates to a polymerization process utilizing a unique initiator.

It is well recognized that there are known organoalkali metal compounds such as the alkyllithium and sodium compounds suitable as initiators for the polymerization of hydrocarbon monomers such as conjugated dienes and vinyl substituted aromatic compounds. These known initiators are effective for the polymerization of hydrocarbon monomers to form homopolymers and copolymers of random and block configurations, but they are often not suitable for the polymerization of various other types of monomers such as $\alpha,\beta$-unsaturated nitriles, esters of acrylic and methacrylic acid, vinylpyridines, vinylquinolines, vinylpyrrolidones, vinyl ketones, vinyl esters and the like. These organoalkali metal compounds often react with these latter named monomers at temperatures ordinarily suited for polymerization instead of effecting polymer formation.

When producing a calcium or magnesium-ketone reaction product, it has been thought necessary to activate the calcium or magnesium by contacting it with mercury to form an alloy or amalgam before contacting it with the organic component. The calcium or magnesium complex thus produced was known as a ketyl, and consisted of a mono-negatively charged organic component. These mono-negatively charged organic ketyls, complexed with magnesium or calcium, are known to be capable of polymerizing monomers such as methyl methacrylate. They have been found ineffective, however, in polymerizing conjugated dienes and vinyl-substituted aromatic hydrocarbons.

It has now been discovered that polymerization initiators can be produced from certain ketones when contacted with elemental calcium or magnesium without first forming the alloy or amalgam with mercury.

It has also been discovered that the unique calcium or magnesium di-negatively charged ketone complexes that are formed according to this invention are effective polymerization initiators capable of polymerizing a large variety of polymerizable monomers comprising unsaturated organic compounds which generally contain the characteristic structure $CH_2=C<$.

Our novel initiators are effective, not only to polymerize monomers of the styrene and butadiene type, but are capable as well to polymerize monomers such as the polymerizable $\alpha,\beta$-unsaturated nitriles, esters of acrylic and methacrylic acid, vinyl ketones, vinylpyridines, vinylquinolines, vinylpyrrolidones, and vinyl esters at temperatures ordinarily suited for polymerization.

It has been further discovered that calcium or magnesium mono-negatively charged ketyls, heretofore necessarily believed to be formed only by the use of an amalgam or alloy of the metal, are ineffective to polymerize conjugated dienes and vinyl aromatic substituted hydrocarbons; while our novel initiators are surprisingly effective.

It is an object of this invention to produce a novel polymerization initiator capable of polymerizing broad varieties of polymerizable monomers such as conjugated dienes, vinyl substituted aromatic hydrocarbons, $\alpha,\beta$-unsaturated nitriles, vinyl ketones, vinylpyridines, vinylquinolines, vinylpyrrolidones, esters of acrylic and methacrylic acid, or vinyl esters and the like.

It is an object of this invention to produce polymerization initiators capable of polymerizing monomers that were not effectively polymerized by calcium or magnesium mono-negatively charged ketyl initiators.

It is another object of this invention to produce new compositions of matter comprising a calcium or magnesium complex with ketones wherein the organic portion of the complex is di-negatively charged.

It is still another object of this invention to provide an improved method for producing calcium and magnesium polymerization initiators by eliminating the amalgam mercury activation process and thus eliminate the handling of this toxic material as well as jointly conserving time and expense.

It is still another object of this invention to provide a novel polymerization process employing the polymerization initiators of this invention.

Other objects, advantages, and features of our invention will be apparent to those skilled in the art from the disclosures and discussion herein set forth.

The ketones employed according to this invention comprise three general groups:

(1) The diaryl ketones represented as

$$Ar-\underset{\underset{O}{\|}}{C}-Ar'$$

wherein Ar and Ar' are each aryl radicals selected from phenyl, 1-naphthyl, or 2-naphthyl, or substituted derivatives thereof in which each of the substituents can be alkyl, cycloalkyl, aryl, alkoxy, aryloxy, alkylthio, arylthio, or N,N'-dialkylamino radicals and combinations thereof such as cycloalkylalkyl, arylalkyl, and the like, said substituents each containing from 1 to 6 carbon atoms, and wherein the carbon atoms of all of the substituents total not more than 25.

Exemplary of those compounds suitable for use are benzophenone;
4-methylbenzophenone;
2,2'-diethylbenzophenone;
4-methoxybenzophenone;
1-naphthyl ketone;
2-naphthyl ketone;
phenyl 1-naphthyl ketone;
4-phenylbenzophenone;
bis[4-(N,N-dimethylamino)-]2-naphthyl ketone;
3-cyclopentylbenzophenone;
4,4'-dimethoxybenzophenone;
bis(6-phenoxy)1-naphthyl ketone;
3-(ethylthio)benzophenone;
4,4'-(diphenylthio)benzophenone;
bis(4-hexyl)-1-naphthyl ketone;
4-ethyl-4'-ethoxybenzophenone;
5-cyclohexyl-1-naphthyl-5'-phenoxy-1-naphthyl ketone;
3-ethylthio-3'-(N,N'-diethylamino)benzophenone;
4-phenyl-4'-(phenylthio)benzophenone;
6-butyl-2-naphthyl 6'-ethoxy 2-naphthyl ketone;
3,3',5,5'-tetraphenylbenzophenone;
3,3',4,4',5,5'-hexabutyl-1-naphthyl ketone;
3,4,5,6-tetraethoxy-2-naphthyl ketone;
3,5-di(hexylthio)-3',5'-di(N,N-dihexylamino)benzophenone and
3,5-di(cyclopentyl)phenyl-3,5,7-tri(cyclopentyl)-1-naphthyl ketone, and the like.

(2) The ketones in which the carbonyl group is present in a five-membered carbocyclic ring to which are attached at least two fused aromatic rings that can be represented as:

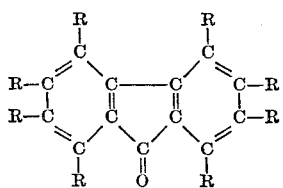

wherein each R is hydrogen or alkyl, cycloalkyl, aryl, alkoxy, aryloxy, alkylthio, arylthio, or N,N-dialkylamino radicals and combinations thereof such as cycloalkylalkyl, arylalkyl, and the like, and wherein said R radicals on adjacent carbon atoms taken together with said adjacent carbons can form an aromatic ring containing 6 carbon atoms and wherein said R radicals comprise a total of not more than 25 carbon atoms. Illustrative of those compounds suitable for use comprise
3,6-dicyclohexyl-9-fluorenone;
2-methyl-9-fluorenone;
4-phenoxy-6-(ethylthio)-9-fluorenone;
3,7-diphenyl-9-fluorenone;
1-(phenylthio)-6-(N,N-diethylamino)-9-fluorenone;
3-butoxy-9-fluorenone;
3,4-benzo-9-fluorenone;
3,4; 6,7-dibenzo-9-fluorenone, 2-cyclopentyl-7-phenyl-9-fluorenone;
1,2; 3,4; 5,6; 7,8-tetrabenzo-9-fluorenone;
1-methyl-3,6-di[4-(N,N-dihexylamino)phenyl]-9-fluorenone;
3,5,7-tri[(3,5-diethoxy)phenylthio]-9-fluoroenone and
3,7-di[(2,4,6-tri-n-butyl)cyclohexyl]-9-fluoroenone, and the like.

(3) An aryl-substituted cyclopentadienone represented as:

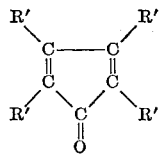

wherein each R' is hydrogen or an aryl selected from phenyl, 1-naphthyl, 2-naphthyl, or substituted derivatives thereof in which each substituent is alkyl, cycloalkyl, aryl, alkoxy, aryloxy, alkylthiol, arylthiol, or N,N-dialkylamino radical and combinations thereof such as cycloalkylalkyl, arylalkyl, and the like, each said substituent containing from 1 to 6 carbon atoms, and wherein at least two R groups are said aryl radicals or substituted derivatives thereof, and wherein the carbon atoms of the substituents total not more than 25.

Exemplary of these compounds suitable for use comprise
2,3-diphenylcyclopentadienone;
2,4-di-(4-tolyl)cyclopentadienone;
2,5-di-(1-naphthyl)cyclopentadienone;
tetraphenylcyclopentadienone;
2-(4-methoxyphenyl)-3-(4-[ethylthio]phenyl)-4,5-diphenylcyclopentadienone;
2,5-di-(3-methylphenyl)cyclopentadienone;
3,4-di(1-naphthyl)cyclopentadienone;
3,5-di(4-phenoxyphenyl)cyclopentadienone;
2,3,4,5-tetra(4-cyclopropylphenyl)cyclopentadienone;
2,4-di(2-naphthyl)cyclopentadienone;
2,3,4,5-tetra(4-hexylphenyl)cyclopentadienone;
3,5-di(4-cyclohexylphenyl)-2,4-diphenylcyclopentadienone;
2,5-di-[4-(phenylthio)phenyl]-3,4-diphenylcyclopentadienone;
3-(1-naphthyl)-2,4,5-triphenylcyclopentadienone;
2-[4-(N,N-diethylamino)phenyl]-3,4,5-triphenylcyclopentadienone;
2,3,4,5-tetra[(3,5-dipropylthio)phenyl]cyclopentadienone;
3-[(3,5,7-triethyl)-1-naphthyl]-5-[(bis-3,5-N,N-dihexylamino)phenyl]cyclopentadienone;
2,3,4-tri (4-phenylthio)phenyl]-5-(4-heptylphenyl)cyclopentadienone and
2,4-di-[(3,5-diphenoxy)phenyl]cyclopentadienone, and the like.

When preparing the initiators of this invention substantially pure elemental calcium or magnesium is employed in the form of turnings or shot or the like, so as to provide a form of calcium with as much exposed surface area as possible. It is important that the calcium or magnesium be protected from air and maintained accordingly so as to prevent the formation of oxides thereon.

The ketone and the elemental calcium or magnesium are brought together at a temperature in the range of about −100 to 200° F., preferably about −20 to 125° F. The contacting is carried out in the presence of an ethereal diluent of mono- or polyethers, including acrylic and cyclic ethers. Alkyl, aryl, or cycloalkyl ethers, or combinations thereof containing 2 to 20 carbon atoms per molecule and about 1 to 4 ether groups per molecule can be employed. Exemplary ethers that can be employed are diethyl ether, dibutyl ether, methyl butyl ether, phenyl methyl ether, diphenyl ether, cyclohexyl methyl ether, tetrahydrofuran, 1,2-dimethoxyethane, 1,4-dioxane and the like. Tetrahydrofuran; 1,2-dimethoxyethane; or 1,4-dioxane are the preferred diluent ethers.

When a very finely divided calcium or magnesium form is employed such as produced by the vaporization of the metal in a furnace as described by V. Sinn, B. Francois, N. Mayer, and J. Parrod in Compt. Rend. (Paris), 262, Ser. C, pp. 541–544 (1966), it is unnecessary to contact the ketone and the calcium or magnesium metal in the presence of an ether diluent. The contacting can then be carried out generally in any inert diluent such as aromatic, cycloaliphatic, or aliphatic hydrocarbons and the like.

Employment of the vaporized metal is not the preferred procedure due to the more costly and more complex electric furnace procedure used for the preparation of such a very finely divided metal.

Metals that have been prepared by such a method often possess polymerization initiator activity themselves, but are, however, generally inferior to the initiators of this invention. The solutions or suspensions of initiators produced according to this invention are more easily handled in charging, measuring, or other transfer operations than the vaporized metals themselves. This subsequently results in improved control of the polymerization reaction in terms of initiator level and thus molecular weight of the polymer.

Another disadvantage of conducting polymerization reactions with finely divided metals as produced by the electric furnace method is that they often show long induction periods and then rapid uncontrolled reactions.

Also, these very finely divided metals are more susceptible to inactivation by accidental contact with air or other oxygen-containing gases resulting in inactivation of large portions of the finely divided metal by the formation of an oxide surface coating thereon.

The ratio of gram atoms of calcium or magnesium to moles of ketone employed is in the range of about 1:1 to 25:1. It is preferred to use an amount of calcium or magnesium in excess of the 1:1 ratio with the more preferred ratio being from 4:1 to 15:1.

It is an aspect of this invention that the calcium or magnesium be contacted with the ketone component until the alkaline molarity of the calcium or magnesium ketone reaction mixture is essentially equal to the molar concentration of the starting ketone. This is to ensure that the ketone is converted to the di-negatively charged form for it is a critical feature of this invention that the di-negatively charged form be produced. A hydrolyzed portion of the reaction mixture can be analyzed by titration with an acid such as hydrochloric acid employing phenolphthalein as an indicator or by any other suitable analytical method known to the art in order to measure the alkaline molarity of the reaction mixture.

Organic promoters which react immediately to expose fresh calcium or magnesium surface metal can also be employed during the preparation of the initiator. Alkyl or alkylene halogen-containing promoters such as 1,2-dibromoethane, methyl iodide, ethyl bromide, ethyl iodide, and the like, function accordingly. The well-known Grignard reaction utilizes such a promoter as described in Organo-Metallic Compounds by G. E. Coates, pp. 46–47, 2nd edition, John Wiley & Sons, Inc., New York (1960).

The amount of promoter, if employed, is generally in the range of about 0.002 to 0.2 mole, preferably about 0.005 to 0.1 mole per gram atom of calcium or magnesium, and preferably containing the bromide or iodide halogen with 1,2-dibromoethane being the preferred promoter for use with this invention.

The initiators, if washed in a non-reactive liquid in which they are less soluble (in comparison to the ethereal diluent in which they were originally formed), show improved initiator activity.

The washing removes excess unreacted organic components and removes excess diluent ether.

Aliphatic or aromatic hydrocarbons such as xylene, toluene, n-pentane, or isooctane are suitable washing liquids. Toluene is the washing liquid preferred. The initiators suitable for washing, as herein described, are those recoverable from the ether diluent. Tetraphenylcyclopentadienone is particularly suited for washing for it is sufficiently insoluble in the ether diluent in that it precipitated as it was formed.

As hereinbefore mentioned, the calcium or magnesium ketone complexes wherein the organo portion of the complex is di-negatively charged can be used to polymerize a broad variety of monomers to form homopolymers and random and block copolymers.

Conjugated dienes, vinyl-substituted aromatic hydrocarbons, $\alpha,\beta$-unsaturated nitriles, esters of acrylic and methacrylic acid, vinyl ketones, vinylpyridines, vinylquinolines, vinylpyrrolidones, vinyl esters, and the like, are effectively polymerized in the presence or absence of diluents. Any diluent which is relatively inert, non-deleterious and liquid under the reaction conditions of the process can be utilized. Hydrocarbon diluents such as paraffins, cycloparaffins, and aromatics can be used as well as others well known to the arts. Conditions ordinarily suited and known in the art for polymerization can be employed with temperatures generally in the range of about −100 to 200° F. with the range from −20 to 125° F. being preferred. Higher and lower temperatures can be employed, if desired. The initiator is generally employed in a concentration of about .1 to 100 (mhm.) gram millimoles per 100 grams of monomer(s) employed and preferably about 1 to 20 (mhm.).

Exemplary of these polymerizable compounds are acrylonitrile; methacrylonitrile, cinnamonitrile; 2-butenenitrile; 2-octenenitrile; 2-dodecenenitrile; 2 - methyl - 2-decenenitrile; methyl acrylate; ethyl acrylate; butyl acrylate; cyclohexyl acrylate; octyl acrylate; dodecyl acrylate; methly methacrylate; ethyl methacrylate; butyl methacrylate; cyclohexyl methacrylate; octyl methacrylate; dodecyl methacrylate; benzyl acrylate; benzyl methacrylate; vinyl acetate; vinyl butyrate; vinyl 2-ethyl hexanoate; vinyl octanoate, vinyl cyclohexanoate; vinyl benzoate; vinyl phenylacetate; vinyl dodecanoate; methyl vinyl ketone; benzyl vinyl ketone; ethyl vinyl ketone; butyl vinyl ketone; octyl vinyl ketone; phenyl vinyl ketone; 1-naphthyl vinyl ketone; 2-ethylhexyl vinyl ketone; cyclohexyl vinyl ketone; cyclododecyl vinyl ketone; 3-methylcyclopentyl vinyl ketone; 4-ethylphenyl vinyl ketone; decyl vinyl ketone; 5-cyclopentyl-2-naphthyl vinyl ketone; styrene; 4-ethylstyrene; 1-vinylnaphthalene; 2-vinylnaphthalene; 9-vinylanthracene; 3-vinylphenanthrene; 4-dodecylstyrene; alpha-methylstyrene; 2 - alpha - methylvinylnaphthalene; 1,3-butadiene; isoprene; 2,3-dimethyl - 1,3-butadiene; 1,3-pentadiene; 1,3-hexadiene; 4,5-diethyl-1,3-octadiene; 2-phenyl-1,3-butadiene; 3 - methyl-1,3-heptadiene; 2-vinylpyridine; 4-vinylpyridine; 2 - methyl-5-vinylpyridine; 4-vinylquinoline; 2-methyl - 8 - vinylquinoline; 1-vinyl-2-pyrrolidone; or 1-vinyl-3,3-dimethyl-2-pyrrolidone; and the like.

The reaction medium employed for preparing the calcium or magnesium ketone reaction products is also suitable for the polymerization process. An in situ technique can be employed for preparing these ketone complexes and for conducting the polymerization process. In this method of operation, all materials for initiator preparation and polymerization are charged initially. As the ketone reaction product is formed, it initiates polymerization of the monomer present in the system.

The solid polymers prepared according to our invention can be employed to produce by conventional methods various molded plastic articles such as containers and the like. The low molecular weight polymers of conjugated dienes can be vulcanized to produce hard, resinous, potting compounds for the electrical industry. They can also be employed for various other uses such as plasticizers, tackifiers, and the like.

The elastomeric polymers can be compounded with vulcanizing agents, fillers, antioxidants, plasticizers, extender oils, and the like, to produce rubbery products suitable for use as tire treads, hose, belting, gaskets, and the like.

The polymers can also be blended with each other, or with various types of known polymeric products to produce useful articles.

The calcium or magnesium complexed ketone initiators produced according to this invention comprise a metal compelxed with a ketone dinegatively charged radical as:

(1) Diaryl ketone complexes represented as:

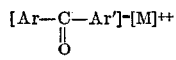

wherein Ar and Ar' are each aryl radicals selected from phenyl, 1-naphthyl, or 2-naphthyl, or substituted derivatives thereof in which each of the substituents can be alkyl, cycloalkyl, aryl, alkoxy, aryloxy, alkylthio, arylthio, or N,N-dialkylamino radicals and combinations thereof such as cycloalkylalkyl, arylalkyl and the like each of said substituents containing from 1 to 6 carbon atoms, and wherein the carbon atoms of all the substituents total not more than 25, and wherein M is calcium or magnesium; or (2) A ketone complex wherein the carbonyl group is present in a five-membered carbocyclic ring to which are attached at least two fused aromatic rings represented as:

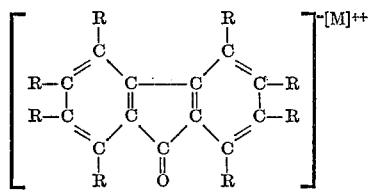

wherein each R is hydrogen or alkyl, cycloalkyl, aryl, alkoxy, aryloxy, alkylthio, arylthio, or N,N-dialkylamino radicals and combinations thereof such as cycloalkylalkyl, arylalkyl, and the like, and wherein said R radicals on adjacent carbon atoms taken together with said adjacent carbons can form an aromatic ring containing 6 carbon atoms and wherein said R radicals comprise a total of not more than 25 carbon atoms and wherein M is calcium or magnesium.

(3) An aryl-substituted cyclopentadienone complex represented as:

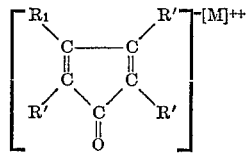

wherein each R' is hydrogen or an aryl radical selected from phenyl, 1-naphthyl, or 2-naphthyl, or substituted derivatives thereof in which the substituents can be alkyl, cycloalkyl, aryl, alkoxy, aryloxy, alkylthiol, arylthiol, or N,N-dialkylamino radicals and combinations thereof such as cycoalkylalkyl, arylalkyl, and the like, each of said substituents containing from 1 to 6 carbon atoms, and where at least two R' groups are aryl radicals, or substituted derivatives thereof and wherein the carbon atoms of the substituents total not more than 25, and wherein M is calcium or magnesium.

Illustrative of our invention and not to be interpreted as a limitation on the materials herein employed or upon the scope thereof the following examples are presented.

EXAMPLE I

Reaction products consisting of calcium complexes containing a dinegatively charged ketone component were prepared according to the following recipe:

Ketone, mol _____ 0.010
Calcium turnings or shot, gram atoms _____ 0.10
1,2-dibromoethane, mol (0.10 ml.) _____ 0.001
Tetrahydrofuran, ml. _____ 100
Calcium:ketone mol ratio _____ 10:1
Temperature, ° F. _____ Variable
Time, hours _____ Variable Table I demonstrates exemplary ketones employed for preparing the polymerization initiator and summarizes the temperature and time of each reaction; the alkalinity of the reaction product; and the weight percent of the ketone conversion.

In Runs 1, 2, and 4, the ketone was charged first. The tetrahydrofuran was charged next, and then the calcium. The reactor was flushed with argon, pressured to 20 pounds per square inch (p.s.i.g.) with argon, and 1,2-dibromoethane was added. In Runs 3 through 5, the ketone was charged first, followed by the calcium and then the tetrahydrofuran. In each run, the reactor was flushed with argon, pressured to 20 pounds per square inch (p.s.i.g.) with argon, and 1,2-dibromoethane was added. The reactor was flushed again with argon and pressured to 20 pounds per square inch (p.s.i.g.) with this gas. The alkalinity of each reaction mixture was determined by titration of a hydrolyzed sample of each reaction mixture with 0.1 N hydrochloric acid and the extent of conversion of the ketone to the di-negatively charged form was calculated from the titration value.

TABLE I

| Run No. | Ketone | Temp., ° F. | Time, hrs. | Alkalinity, M | Conv. of ketone, wt. percent |
|---|---|---|---|---|---|
| 1 | Fluorene-9-one | 41 | 118 | 0.108 | 100 |
| 2 | Benzophenone | 41 | 118 | 0.105 | 100 |
| 3 | do | −22 | 118 | 0.108 | 100 |
| 4 | 4-methylbenzophenone | 41 | 94 | 0.110 | 100 |
| 5 | Tetraphenylcyclopentadienone | 41 | 94 | 0.104 | 100 |

Example I exemplifies fruition of this invention by successfully demonstrating the preparation and production of the calcium ketone complexes wherein the organic portion is di-negatively charged as evidenced by the alkalinity titration determinations.

EXAMPLE II

Reaction products consisting of magnesium complexed with a di-negatively charged ketone component are prepared according to the following recipe:

Magnesium, turnings or shot, gram atoms _____ 0.10
Ketone, mol _____ 0.010
1,2-dibromoethane, mol (0.10 ml.) _____ 0.001
Tetrahydrofuran, ml. _____ 100
Magnesium:ketone mol ratio _____ 10:1
Temperature, ° F. _____ 41
Time, hours _____ 120

Fluorene-9-one, benzophenone, 4-methylbenzophenone, and tetraphenylcyclopentadienone are the ketones employed according to the rceipe shown above. In each of these runs the ketone is charged, first followed by tetrahydrofuran and then the magnesium turnings. The reactor is flushed with argon, pressured to 20 pounds per square inch (p.s.i.g.) with argon and 1,2-dibromoethane added. The reactor is flushed again with argon and pressured to 20 pounds per square inch (p.s.i.g.). At the end of each run the reaction mixture is analyzed by titration of a hydrolyzed sample of each mixture with 0.1 N hydrochloric acid employing phenolphthalein indicator. Each titration shows the alkaline molarity to be essentially the same as the molar concentration of the ketone. Example II further exemplifies, as evidenced by the alkalinity titration determinations that each ketone is converted to the di-negatively charged form and represents the successful employment of magnesium in the production of di-negatively charged ketone reaction products.

EXAMPLE III

Calcium reaction products of Example I were employed as initiators for the polymerization of methyl methacrylate, methyl vinyl ketone, styrene, and 1,3-butadiene. Polymerizations were conducted in the presence of either toluene or cyclohexane as a diluent which was charged first in all runs. The reactor was then purged with nitrogen. In the methyl methacrylate runs, the initiator was charged following the diluent, the temperature was adjusted, and the monomer was added. In the methyl vinyl ketone runs, the monomer was charged following the diluent, the temperature was adjusted, and the initiator was added. This latter order of addition was also followed for the polymerization of styrene and butadiene.

All runs were terminated with isopropyl alcohol except Runs 6 and 7. In these runs a 10 weight percent solution of 2,2'-methylene-bis(4-methyl-6-tert-butylphenol) in isopropyl alcohol was added to provide approximately 1 part by weight of this antioxidant per 100 parts of monomer charged. The products from Runs 1, and 3 through 8 were recovered by coagulation in isopropyl alcohol. The products were separated and dried in a vacuum oven. The product from Run 2 was recovered by evaporation of the liquids. In Runs 9, 10, and 12, following coagulation with isopropyl alcohol and separation of the products, the polymers were dissolved in chloroform and recoagulated in isopropyl alcohol. A solid product was present in Run 11 and was recovered by decanting the liquid, dissolving the solid in acetone, filtering and evaporating the filtrate. The micro structure was determined on the product from Run 7 by infrared examination which showed the polymer microstructure to be 21 percent cis, 31 percent trans, and 48 percent vinyl unsaturation. Data representing several of the calcium initiators of this invention that can be employed for the effective polymerization of a variety of monomers are presented in Table II wherein useful operability of our ketone calcium polymerization initiators is demonstrated.

Polymerization recipe

| | |
|---|---|
| Monomer, parts by weight | 100 |
| Toluene, parts by weight | 870 |
| Magnesium—ketone reaction product, millimoles | 10 |
| Temperature | Variable |
| Time, hours | 48 |

In these runs the toluene is charged first, followed by the monomer. The temperature is adjusted and the initiator is added. All runs except No. 2 are terminated with isopropyl alcohol. Run No. 2 is terminated with a 10 weight percent solution of 2,2'-methylene-bis-(4-methyl-6-tert-butylphenol) in isopropyl alcohol with the amount added being sufficient to provide approximately 1 part by weight per 100 parts of butadiene charged. The product from each run is recovered by evaporation of the excess liquid and each polymeric residue is dried in a vacuum oven.

The data of Table III demonstrates that the magnesium initiators of this invention can be employed for the polymerization of a variety of monomers.

TABLE III

| Run No. | Mg-ketone product ketone | Monomer | Temp., °F. | Product |
|---|---|---|---|---|
| 1 | 9-fluorenone | Methyl methacrylate | 41 | Solid. |
| 2 | Benzophenone | 1,3-butadiene | 158 | Liquid. |
| 3 | 4-methylbenzophenone | Styrene | 158 | Solid. |
| 4 | Tetraphenylcyclopentadienone | Methyl vinyl ketone | 41 | Do. |

Calcium complexes of ketones wherein the organic portion of said complex was mono-negatively charged were found to be ineffective for the polymerization of butadiene or styrene.

4 - bromobenzophenone and 4 - fluorobenzophenone, wherein the organic complex was mono - negatively charged as determined by alkalinity titrations, were alternately tested in a polymerization run essentially performed as Run No. 8, Table II for periods of from about 25 to 49 hours which resulted in zero conversion in each run. The novelty of the invention is clearly exemplified by the foregoing data and tables in demonstrating the effectiveness of our invention to produce these novel polymerization initiators and their ability to polymerize a broad variety of monomers.

As will be evident to those skilled in the art, various modifications of this invention can be made, or followed, in light of the teachings and discussions set forth herein without departing from the scope or spirit of our invention.

We claim:
1. A composition of matter consisting essentially of

TABLE II

| | Monomer | | Diluent | | Initiator | | Temp., °F. | Time, hrs. | Conv., percent | Inh. visc. | Type of product |
|---|---|---|---|---|---|---|---|---|---|---|---|
| Run No. | Type | Parts by wt. | Type | Parts by wt. | From Run | Mmoles | | | | | |
| 1 | Methyl methacrylate | 100 | Toluene | 870 | 1 | 5.3 | 41 | 115 | 100 | ¹ 3.09 | Solid. |
| 2 | Methyl vinyl ketone | 100 | Cyclohexane | 780 | 1 | 5.4 | 41 | 47 | 50 | ¹ 0.06 | Do. |
| 3 | Methyl methacrylate | 100 | Toluene | 870 | 2 | 5.3 | 41 | 115 | 100 | ¹ 2.50 | Do. |
| 4 | Styrene | 100 | Cyclohexane | 780 | 2 | 5.3 | 158 | 56 | 9 | (²) | Do. |
| 5 | do | 100 | do | 780 | 2 | 10.6 | 158 | 56 | 19 | (²) | Do. |
| 6 | 1,3-butadiene | 100 | do | 780 | 3 | 10.8 | 122 | 47 | 13 | 0.09 | Liquid. |
| 7 | do | 100 | do | 780 | 3 | 10.8 | 158 | 47 | 18 | 0.19 | Do. |
| 8 | Styrene | 100 | do | 780 | 7 | 5.5 | 122 | 49 | 12 | (²) | Solid. |
| 9 | Methyl methacrylate | 100 | Toluene | 870 | 7 | 5.5 | 41 | 28 | 93 | ¹ 2.51 | Do. |
| 10 | do | 100 | do | 870 | 8 | 6.7 | 41 | 28 | 22 | ¹ 3.11 | Do. |
| 11 | Methyl vinyl ketone | 100 | Cyclohexane | 780 | 9 | 5.2 | 41 | 47 | 30 | (³) | Do. |
| 12 | Methyl methacrylate | 100 | Toluene | 870 | 9 | 5.2 | 41 | 28 | 90 | ¹ 2.06 | Do. |

¹ Determined in chloroform.  ² Not determined.  ³ 80% insoluble in chloroform.

EXAMPLE IV

The magnesium reaction products of Example II are employed as initiators for the polymerization of methyl methacrylate, methyl vinyl ketone, styrene, and 1,3-butadiene. The polymerization runs are conducted according to the following recipe:

(a) a di-negatively charged ketone complex of calcium or magnesium of the formula:

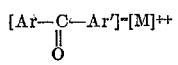

$$[Ar-\underset{\underset{O}{\|}}{C}-Ar']^=[M]^{++}$$

wherein Ar and Ar' are aryl radicals selected from phenyl, 1-naphthyl, 2-naphthyl, or substituted derivatives thereof in which each of the substituents can be alkyl, cycloalkyl, aryl, alkoxy, aryloxy, alkylthio, arylthio radicals and combinations thereof, each of said substituents containing from 1 to 6 carbon atoms, and wherein the carbon atoms of all of the substituents total not more than 25 and M is calcium or magnesium, and an inert diluent.

2. The composition of matter in accord with claim 1 wherein the ketone di-negatively charged radical is formed from benzophenone, 4-methyl-benzophenone, or 4-methoxybenzophenone.

3. A process for producing polymerization initiators in accord with claim 1 wherein said initiator is a di-negatively charged ketone complex of calcium or magnesium which comprises contacting, until the alkaline molarity of the calcium or magnesium ketone reaction mixture is essentially equal to the molar concentration of the starting ketone, substantially pure calcium or magnesium metal in the presence of an inert diluent at a temperature in the range of about −100 to 200° F. with a ketone wherein the ratio of gram atoms of calcium or magnesium to mole of ketone is in the range of about 1:1 to 25:1, wherein said ketone is:

(a) a diaryl ketone represented as

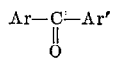

wherein Ar and Ar′ are aryl radicals selected from phenyl, 1-naphthyl, 2-naphthyl, or substituted derivatives thereof in which each substituent is alkyl, cycloalkyl, aryl, alkoxy, aryloxy, alkylthio, arylthio radicals or combinations thereof, each of said substituents containing from 1 to 6 carbon atoms, and wherein the carbon atoms of all of the substituents total not more than 25.

4. The process of claim 3 wherein said inert diluent is selected from the class consisting of acyclic and cyclic ethers containing oxygen, hydrogen, and carbon, and aromatic, cycloaliphatic or aliphatic hydrocarbons.

5. The process of claim 4 wherein said inert diluent is selected from the class consisting of diethyl ether, dibutyl ether, methyl butyl ether, phenyl methyl ether, diphenyl ether, cyclohexyl methyl ether, tetrahydrofuran, -1,2-dimethoxyethane, and 1,4-dioxane.

6. The process of claim 4 wherein said metal and said ketone are contacted in the presence of a promoter selected from the class consisting of alkyl and alkaline halogen-containing hydrocarbons and the promoter is present in the range of about 0.002 to 0.2 mole per gram atom of calcium or magnesium.

7. The process of claim 6 wherein said promoter is 1,2-dibromoethane, methyl iodide, ethyl bromide, or ethyl iodide.

8. The process of claim 3 wherein said di-negatively charged ketone component is complexed with calcium.

9. The process of claim 3 wherein said di-negatively charged ketone is complexed with magnesium.

10. The process of claim 3 wherein the substantially pure calcium or magnesium metal has been finely divided by the vaporization thereof.

References Cited
UNITED STATES PATENTS

| | | | |
|---|---|---|---|
| 2,873,275 | 2/1959 | Ramsden | 260—590 |
| 2,921,940 | 1/1960 | Ramsden | 260—590 |
| 3,196,159 | 7/1965 | Bencze | 260—590 |

DANIEL D. HORWITZ, Primary Examiner

U.S. Cl. X.R.

260—590, 570.8, 63, 86.1, 88.7, 89.5, 80.72; 252—431